(12) United States Patent
Mossner

(10) Patent No.: US 8,121,455 B2
(45) Date of Patent: Feb. 21, 2012

(54) CARRIER SYSTEM FOR MOUNTING TELECOMMUNICATION AND DATA TECHNOLOGY DEVICES

(75) Inventor: Frank Mossner, Berlin (DE)

(73) Assignee: ADC GmbH, Berlin (DE)

( * ) Notice: Subject to any disclaimer, the term of this patent is extended or adjusted under 35 U.S.C. 154(b) by 227 days.

(21) Appl. No.: 12/528,718

(22) PCT Filed: Feb. 15, 2008

(86) PCT No.: PCT/EP2008/001157
§ 371 (c)(1), (2), (4) Date: Aug. 26, 2009

(87) PCT Pub. No.: WO2008/104284
PCT Pub. Date: Sep. 4, 2008

(65) Prior Publication Data
US 2010/0150515 A1 Jun. 17, 2010

(30) Foreign Application Priority Data

Mar. 1, 2007 (DE) .................... 20 2007 008 151 U
Jul. 11, 2007 (DE) ........................ 10 2007 032 186

(51) Int. Cl.
*G02B 6/00* (2006.01)
(52) U.S. Cl. ........................................ 385/135
(58) Field of Classification Search .................... None
See application file for complete search history.

(56) References Cited

U.S. PATENT DOCUMENTS

| | | | |
|---|---|---|---|
| 3,728,467 A | 4/1973 | Klayum et al. | |
| 5,210,374 A | 5/1993 | Channell | |
| 5,261,024 A | 11/1993 | Allen et al. | |
| 5,430,823 A | 7/1995 | Dupont et al. | |
| 5,758,004 A | 5/1998 | Alarcon et al. | |
| 5,764,844 A | 6/1998 | Mendes | |
| 5,774,618 A | 6/1998 | Jones | |
| 5,793,920 A | 8/1998 | Wilkins et al. | |
| 5,884,002 A | 3/1999 | Cloud et al. | |
| 6,178,282 B1 | 1/2001 | Moribe et al. | |
| 6,275,639 B1 | 8/2001 | Bolt et al. | |
| 6,434,313 B1 | 8/2002 | Clapp, Jr. et al. | |
| 6,556,763 B1 | 4/2003 | Puetz et al. | |
| 6,612,515 B1 | 9/2003 | Tinucci et al. | |
| 6,616,463 B1 | 9/2003 | Burnett et al. | |
| 7,038,137 B2 | 5/2006 | Grubish et al. | |

(Continued)

FOREIGN PATENT DOCUMENTS

DE 35 25 246 2/1987

(Continued)

OTHER PUBLICATIONS

U.S. Non-Final Office Action cited in U.S. Appl. No. 12/528,698, mailed Jun. 27, 2011.

*Primary Examiner* — Charlie Peng
*Assistant Examiner* — Mary El Shammaa
(74) *Attorney, Agent, or Firm* — Merchant & Gould P.C.

(57) ABSTRACT

The invention relates to a support system (5) for fixing telecommunication and data systems technology resources, comprising at least one profiled support (72), wherein the at least one profiled support (72) is constructed with fixing means on at least one side and with further fixing means (135) by means of which resources can be fixed to the front and/or rear (V, R) of the support system (5).

13 Claims, 12 Drawing Sheets

U.S. PATENT DOCUMENTS

| | | |
|---|---|---|
| 7,302,151 B2 | 11/2007 | Lapp |
| 7,783,152 B2 | 8/2010 | Knorr et al. |
| 2002/0051616 A1 | 5/2002 | Battey et al. |
| 2003/0223725 A1 | 12/2003 | Laporte et al. |
| 2005/0249475 A1 | 11/2005 | Womack et al. |
| 2009/0087158 A1 | 4/2009 | Knorr et al. |
| 2010/0061686 A1 | 3/2010 | Hetzer et al. |
| 2010/0061687 A1 | 3/2010 | Hetzer et al. |
| 2010/0061692 A1 | 3/2010 | Hetzer et al. |
| 2010/0183275 A1 | 7/2010 | Hetzer et al. |

FOREIGN PATENT DOCUMENTS

| | | |
|---|---|---|
| DE | 3528246 | 2/1987 |
| DE | 691 24 902 | 6/1997 |
| DE | 202 20 848 | 5/2004 |
| DE | 103 14 262 | 6/2004 |
| DE | 20 2006 006 18 | 8/2006 |
| EP | 0 159 857 | 10/1985 |
| EP | 0 498 599 | 7/1996 |
| EP | 1 431 793 | 6/2004 |
| GB | 2 307 563 | 5/1997 |
| GB | 2 373 493 | 9/2002 |
| WO | WO 93/26070 | 12/1993 |
| WO | WO 94/23324 | 10/1994 |
| WO | WO 97/19377 | 5/1997 |
| WO | WO 99/67670 | 12/1999 |
| WO | WO 00/65397 | 11/2000 |
| WO | WO 2004/051337 | 6/2004 |

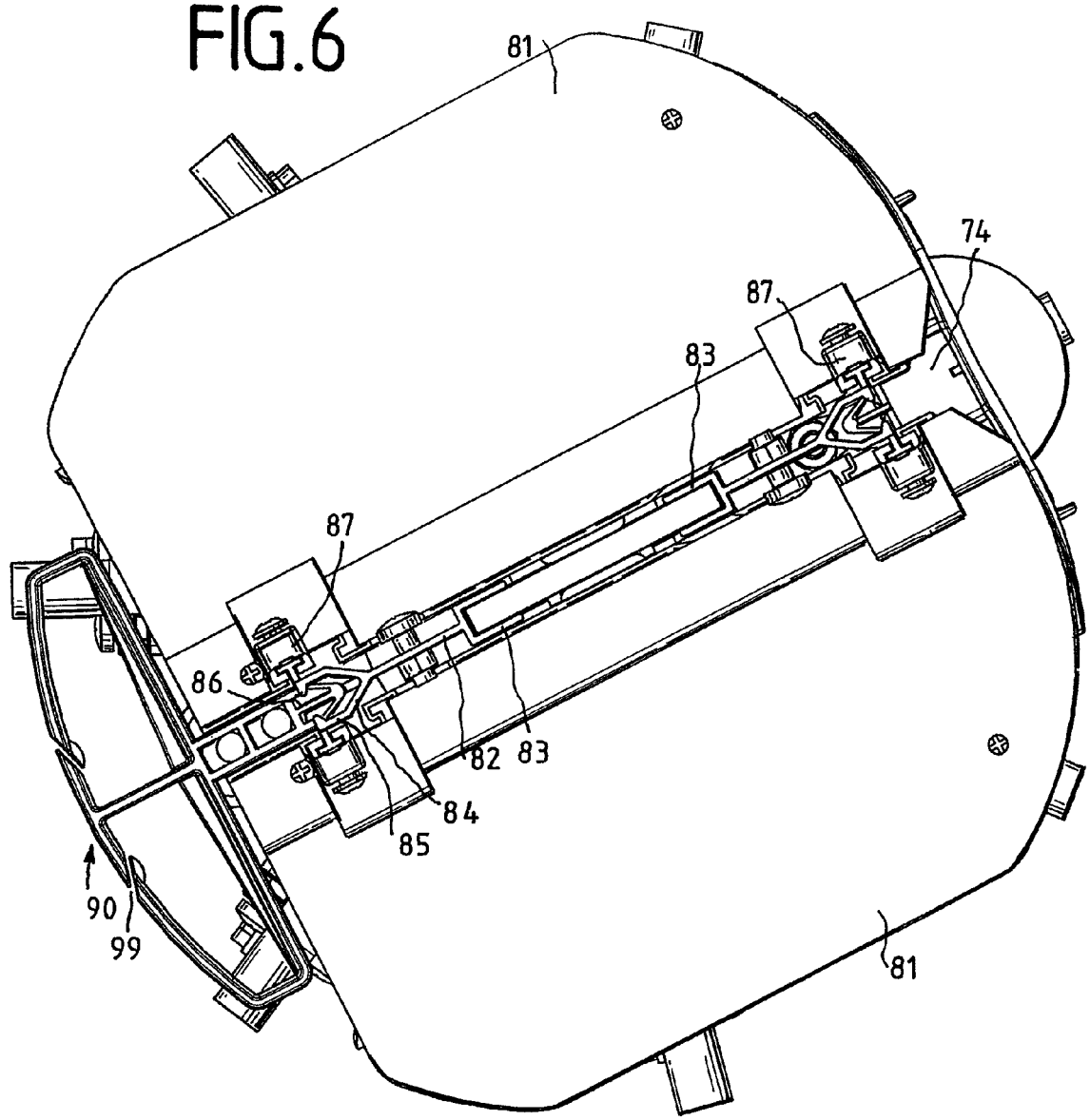

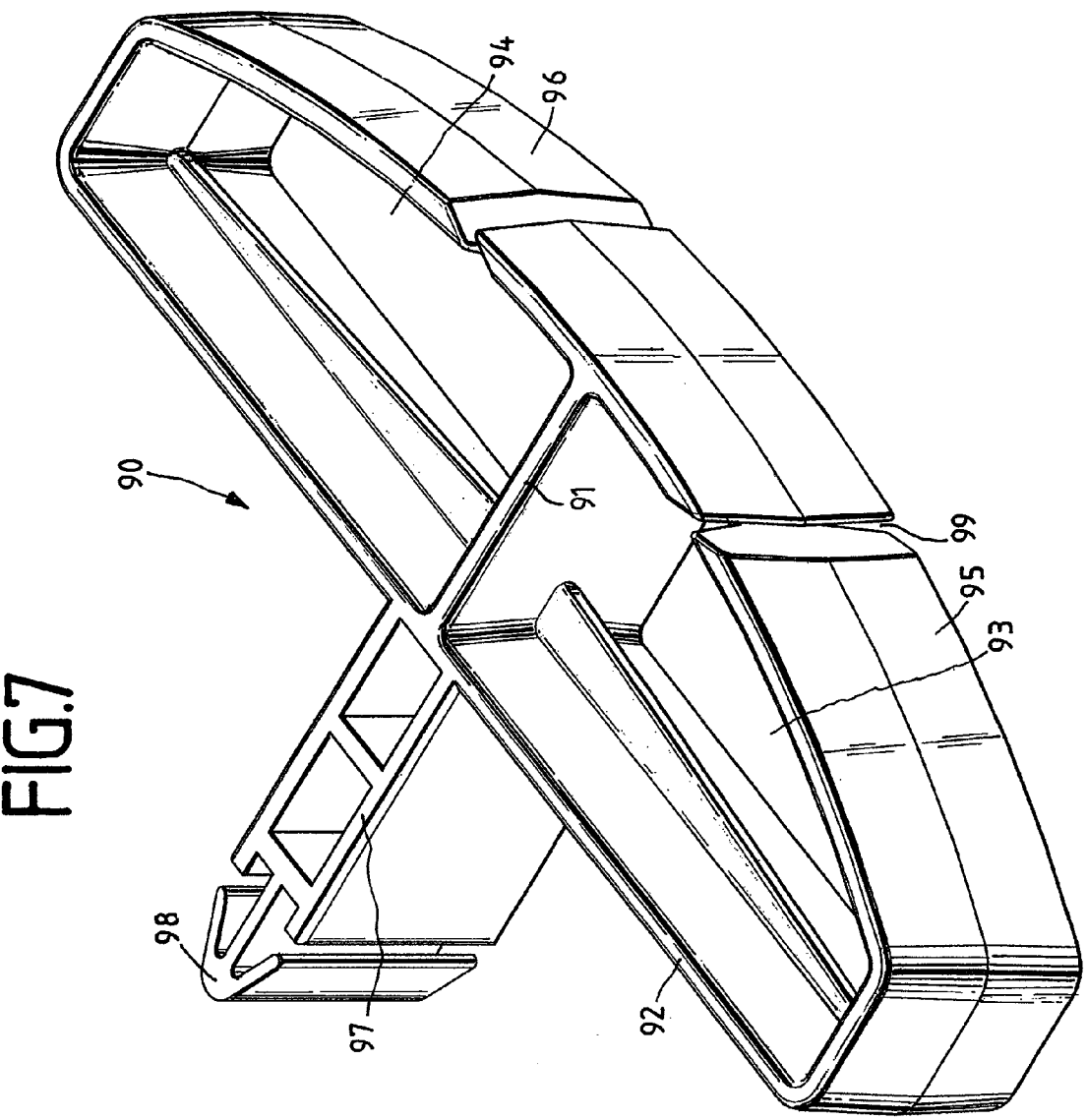

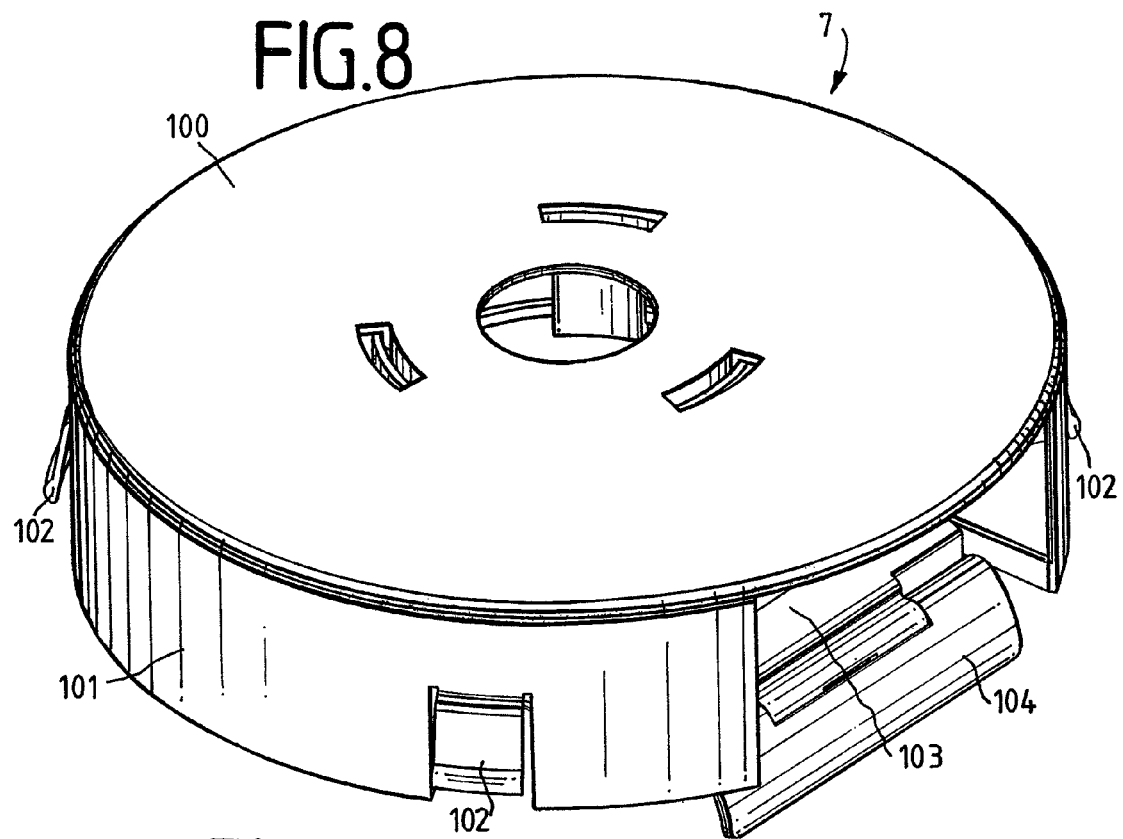
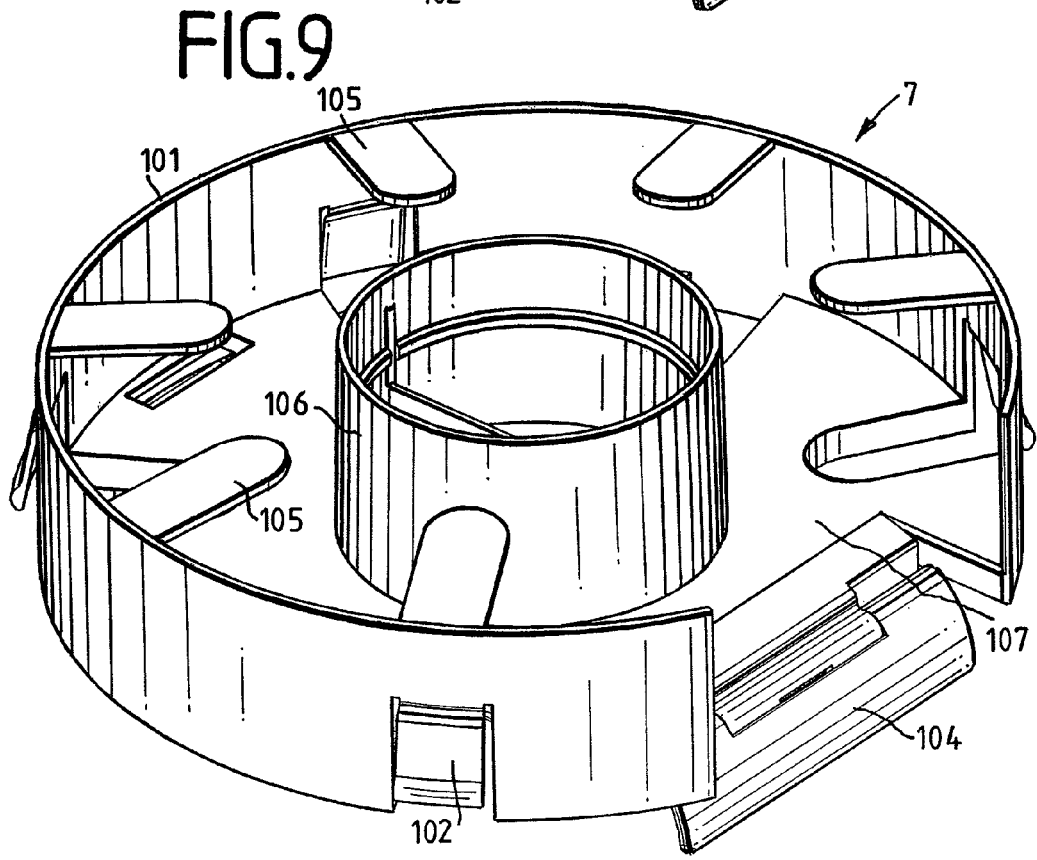

CARRIER SYSTEM FOR MOUNTING TELECOMMUNICATION AND DATA TECHNOLOGY DEVICES

This application is a National Stage Application of PCT/EP2008/001157, filed 15 Feb. 2008, which claims benefit of Serial No. 20 2007 008 151.0, filed 1 Mar. 2007 in Germany and Serial No. 10 2007 032 186.6, filed 11 Jul. 2007 in Germany and which applications are incorporated herein by reference. To the extent appropriate, a claim of priority is made to each of the above disclosed applications.

BACKGROUND

The invention relates to a support system for fixing telecommunication and data systems technology resources, particularly for use in a cable closure for optical fiber cables.

Closures for optical fiber cables are generally used for connecting individual fibers of one or more units of a cable with another cable, wherein applications are also possible where all units or fibers of the cable are only looped through the closure. The closures usually have a case top and a case bottom, the case bottom also being called endplate. The case bottom has openings through which optical fiber cables can be guided into the closure. The optical fiber cables have a multiplicity of units. The units, in turn, consist of at least two optical fibers having common cladding.

When a cable is looped through, two cases are conceivable. In one case, a cable is stripped at one place and guided into the closure. For this purpose, the units are again guided downward in the closure to another opening and brought out of the closure again as cable with insulation. Physically, the incoming and outgoing cable is one and the same cable. In the other case, the cable ends at the closure and is connected with another cable which also ends at the closure. For this purpose, the individual fibers are spliced in splice cassettes which are arranged at a support system.

Apart from the looping-through, individual fibers of a cable are also detached in the closure and connected with a fiber of another cable, the other fibers being continued in the original cable. One problem in the known closures is guiding looped-through units since these must remain in the closure with a certain spare length if they are to be spliced at a later time. For this reason, the units are coiled and these coils are stuffed into spaces in the support system.

SUMMARY

The invention is based on the technical problem of creating a support system for fixing telecommunication and data systems technology resources which enables various resources to be fixed in a more structured manner.

For this purpose, the support system for fixing telecommunication and data systems technology resources comprises at least one profiled support, wherein the at least one profiled support is constructed with fixing means on at least one side and with further fixing means, wherein the further fixing means can be used for fixing resources to the front and/or rear of the support system. This makes it possible to implement structured fixing so that functionally different resources can also be arranged separately from one another. When the support system is used in a cable closure for optical fiber cables, for example, splice cassettes can be fastened at the front and rear, whereas unit guides and/or fiber guides can be arranged on a side. The support system preferably has fixing means on both sides since this makes it possible to improve the structuring further. This can be achieved by a profiled support or by two parallel profiled supports.

In a preferred embodiment, the support system comprises two profiled supports, wherein the profiled supports in each case have a center plate-shaped area which is adjoined on one side by a U-shaped area and on the other side by an area which is initially constructed to be V-shaped, the arms then extending in parallel in the direction of the outside and having inward-pointing bends, wherein the two profiled supports are aligned in such a manner that the arms of the U-shaped areas are opposite one another. The advantage of this embodiment is that arbitrary widths of the support system can be adjusted depending on the spacing of the two profiled supports. The two U-shaped areas form a further fixing means between them. Thus, for example, a unit repository can be inserted from the top onto the support system into the receptacle forming between the two U-shaped areas. A further advantage of the embodiment with two spaced profiled supports compared with a one-piece solution is a saving in weight.

In a further preferred embodiment, the fixing means for the front and/or rear are constructed to be T-shaped.

In a further preferred embodiment, a center support, which is preferably constructed as plate, is arranged on the underside of the support system. The support system can then be connected, for example, to a bracket via this center support.

The center support is preferably arranged between the U-shaped areas and is further preferably screwed to the profiled supports.

In a further preferred embodiment, the center support is constructed with holes. Apart from the possible screwing to the profiled supports, already described, for example, a fiber management system can also be screwed to the front and/or rear of the center support.

In a further preferred embodiment, stiffening plates are arranged between the profiled supports, which are preferably screwed on and are preferably arranged between the U-shaped areas.

BRIEF DESCRIPTION OF THE DRAWINGS

In the text which follows, the invention will be explained in greater detail with reference to a preferred exemplary embodiment. The figures show in.

DETAILED DESCRIPTION

Figure 1:
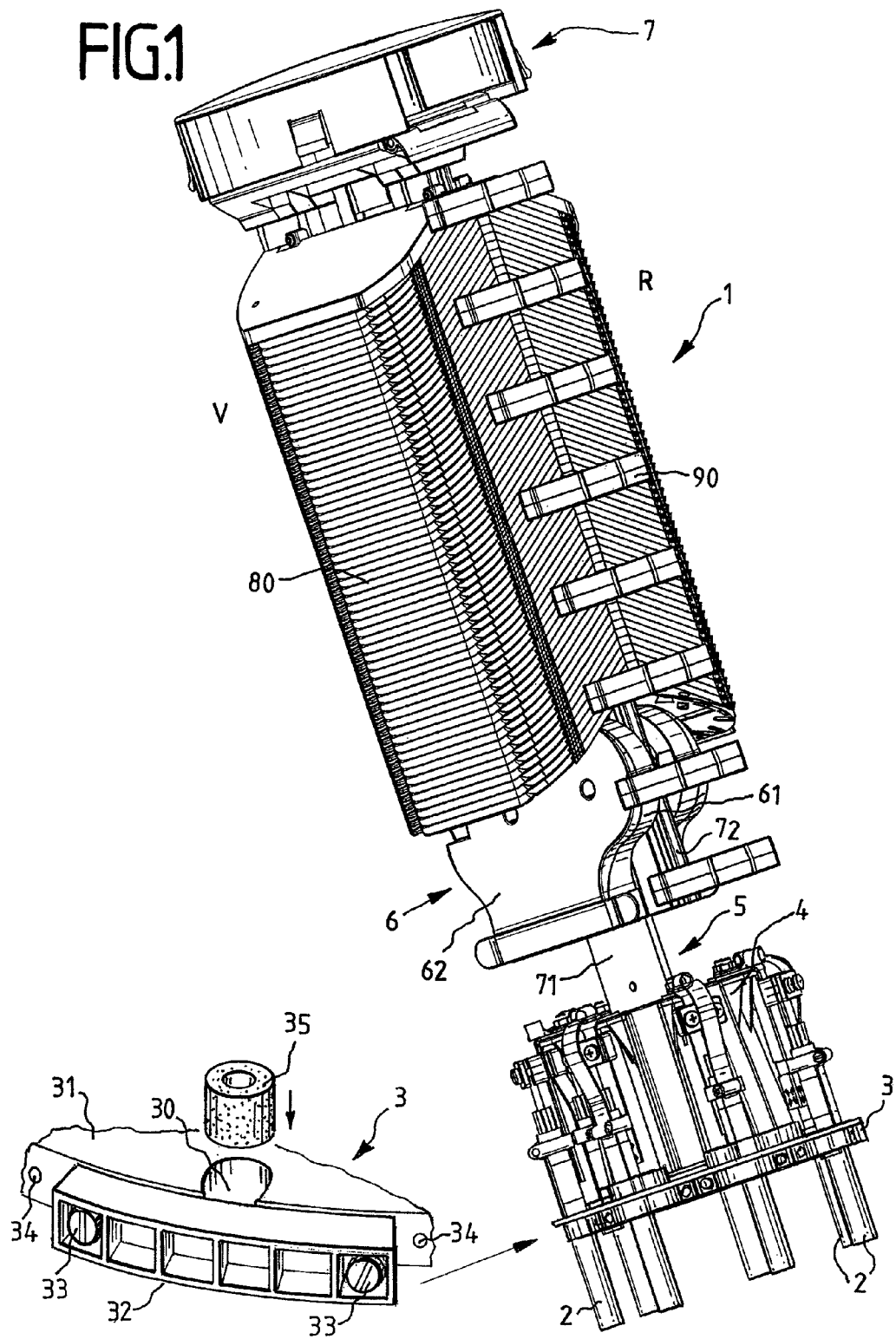
FIG. 1 a perspective front view of a closure for optical fiber cables without case top, FIG. 2 a perspective representation of a bracket with ground plate, FIG. 3 a perspective front view of a part of the fiber management system, FIG. 4 a perspective rear view of the part according to FIG. 3, FIG. 5 a perspective side view of the fiber management system, FIG. 6 a top view of the closure with the unit repository removed, FIG. 7 a perspective representation of a unit guide, FIG. 8 a perspective representation of a unit repository, FIG. 9 a perspective representation of the unit repository without lid, FIG. 10 a perspective bottom view of the unit repository in the raised state, FIG. 11 a side view of a case top, FIG. 12 a top view of a profiled support of a support system, FIG. 13 a side view of the profiled support, FIG. 14 a perspective representation of a profiled support, and FIG. 15 a perspective part-representation of the support system with a center support.
Figure 11:
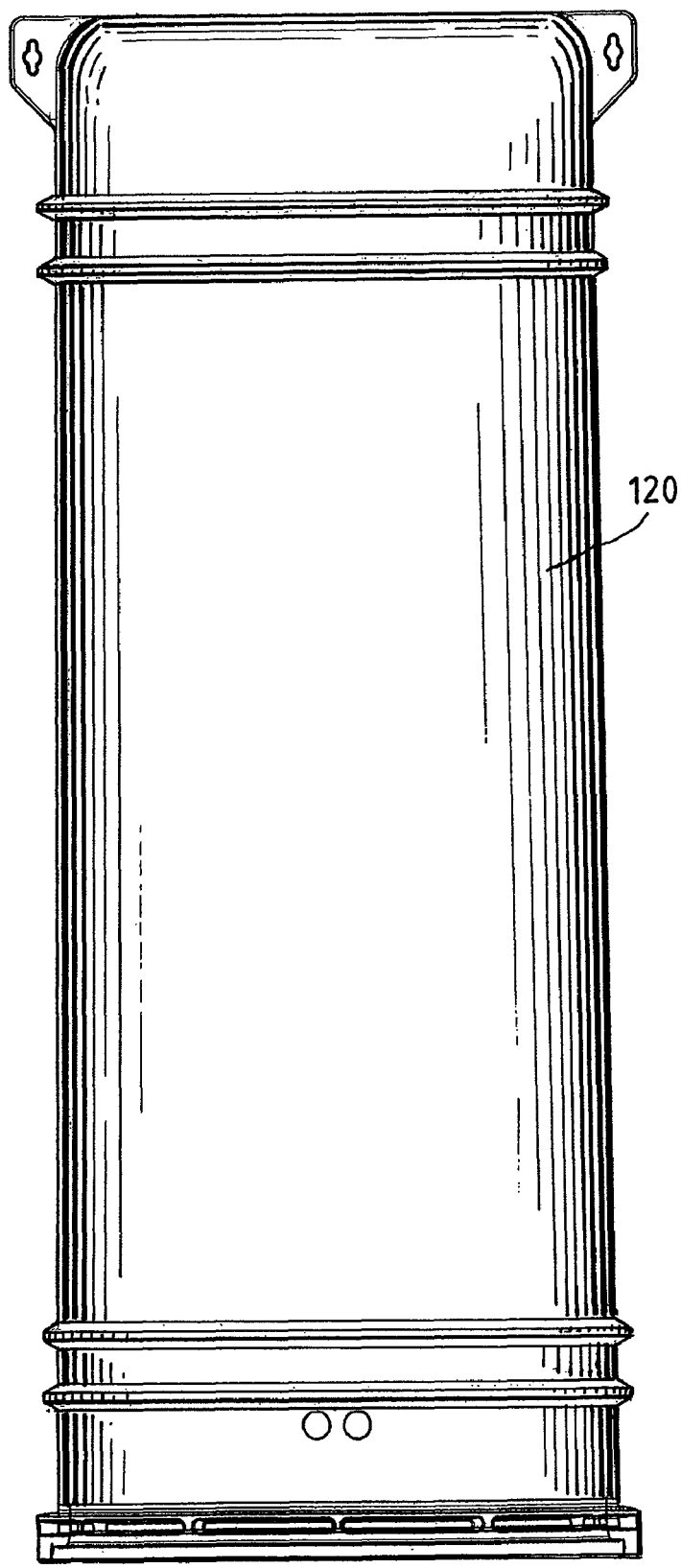

FIG. 1 shows a closure 1 for optical fiber cables 2 without case top 120 (see FIG. 11). The closure 1 comprises a case bottom 3, a bracket 4, a support system 5, a fiber management system 6 and a unit repository 7. The case bottom 3 is constructed with openings 30 for optical fiber cables 2 which are sealed against humidity by sealing elements 35. In this arrangement, the case bottom 3 is constructed of several parts, lateral circumferential parts 32 of the case bottom 3 being attached detachably to a baseplate 31, including edging parts of the openings 30, preferably by means of screws 33 which are screwed into threads 34 of the baseplate 31. Preferably, as many circumferential parts 32 as there are openings 30 for optical fiber cables 2 are detachably arranged, each circumferential part 32 exposing exactly one opening 30 laterally or radially.

Figure 2:
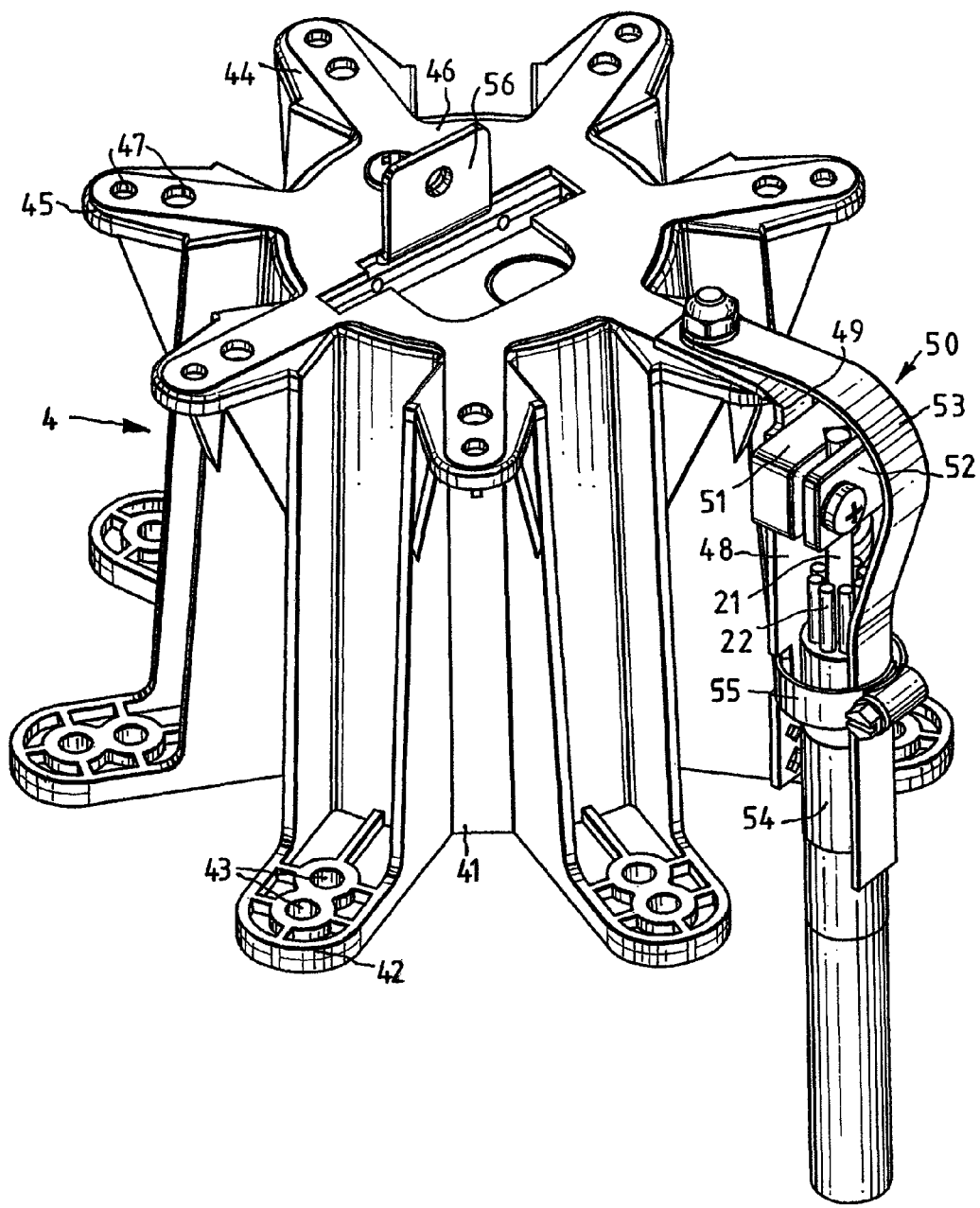

Initially, FIG. 2 will be used for explaining the connecting of the optical fiber cables 2. The bracket 4, consisting of plastic, has a star-shaped cross section and is constructed at its underside 41 with base feet 42 which have holes 43. The bracket 4 can then be screwed to the case bottom 3 by means of screws, not shown. The top side 44 has a round center area from which seven seats 45 project in the form of a star. On the top side 44, a ground plate with holes 47 is constructed which are flush with openings in the seats 45. In each case, a metal angle 48 is screwed to the ground plate 46, which has a designed bending point 49 in the form of a diminution. At the metal angle 48, a fixing element 50 for fixing a central element 21 of the optical fiber cable 2 is arranged. The fixing element 50 comprises a cheek 51 with an indentation and a screwable plate 52. In the example shown, a ground connection of the optical fiber cable 2 by means of a ground strap 53 is shown which is screwed to the metal angle 48 and the bracket 4. The ground strap 53 is bent in such a manner that it rests against the optical fiber cable 2 at the side opposite to the metal angle 48. A ground connection in optical fiber cables 2 is used in most cases when they are constructed with a metal foil as diffusion protection against humidity. For this purpose, the outer cladding of the optical fiber cable 2 is then partially removed and the metal foil is exposed. Onto the exposed metal foil and the ground strap 53, a scroll spring 54 is then wound which then elastically presses the ground strap 53 against the metal foil and thus electrically connects these to one another (which is not shown in FIG. 2). The ground strap 53 is then screwed to the metal angle 48 and the ground plate 46, the ground connection then being conducted to the outside via a connection, not shown, to the screws 33 of the bottom 3. Furthermore, the metal angle 48, the optical fiber cable 2 are mechanically connected to one another via a clamp 55 so that the optical fiber cable 2 is mechanically fixed. Furthermore, FIG. 2 shows a number of units 22 which are arranged around the central element 21. Units 22 comprise a number of fibers having common cladding. For reasons of clarity, the units 22 are shown here cut-off, whereas they are actually conducted towards the top. Furthermore, a mounting arm 56 is shown to which a center support 71 of the support system 5 is screwed. Due to the designed bending point 49 and the detachable circumferential parts 32 of the case bottom 3, a defective case bottom 3 can be replaced without separating optical fiber connections in the closure 1. For this purpose, the circumferential parts 32 of the case bottom 3 are detached where optical fiber cables 2 are connected. Following that, the optical fiber cables 2 are bent away obliquely to the side via the designed bending point 49 and the defective case bottom 3 is removed. A new case bottom 3 is correspondingly assembled in the reverse order.

Figure 3:
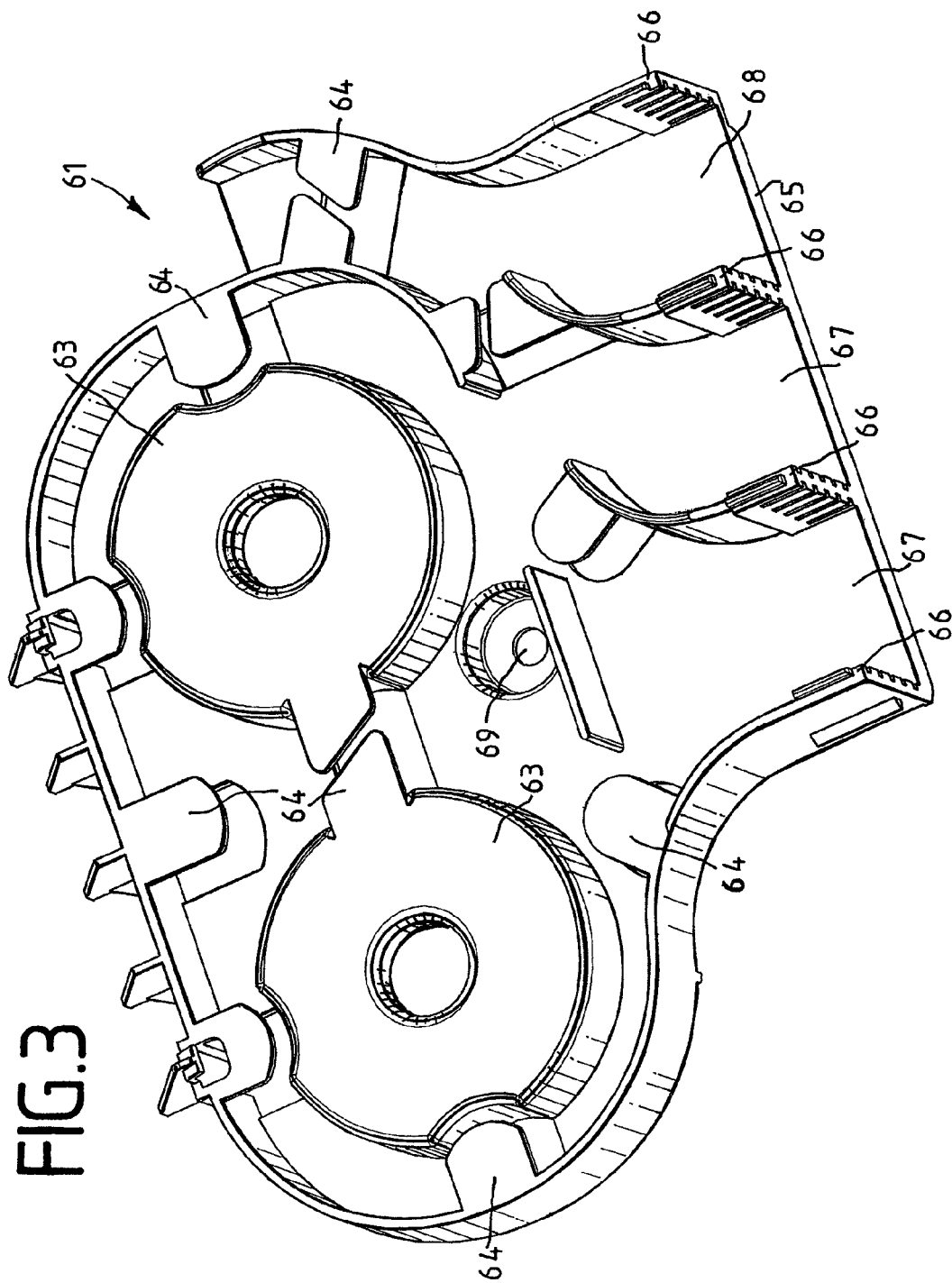

FIG. 3 shows a fiber guide 61 of the fiber management system 6 which is covered by a cover 62 in FIG. 1. As shown in FIG. 1, a fiber guide 61 is arranged at the front V of the support system 5 and a fiber guide 61 is arranged at the rear R of the support system 5. The fiber guide 61 comprises two coil formers 63 and a number of retainers 64. At an underside 65 which faces the bracket 4, guide webs 66 are arranged which form guides 67, 68. If then individual fibers of a unit 22 are to be connected to another optical fiber cable 2, the unit is cut. The end of the units is fixed in the lower area of the guides 67 and 68 in a part, not shown. The fibers which are to be connected to another optical fiber cable 2 are supplied via the guide 68 to one or more splice cassettes 80 which are arranged at the front and rear V, R of the support system 5 above the fiber management system 6. Both the forward-going and the returning fibers are carried in the guide 68. The remaining fibers of a unit 22 which are not to be connected to another optical fiber cable 2 but are looped through are conducted into the guide 67 where the necessary spare length or splicing margin is wound onto the coil former 63 and these fibers are then carried back to the optical fiber cable 2 from the other guide 67. In this arrangement, it is also possible to conduct fibers which are to be connected to another optical fiber cable 2, first into the guide 67 and from there into the guide 68. The fiber guide 61 has centrally an opening 69 through which the fiber guide 61 can be screwed to the center support 71 of the support system 5.

Figure 4:
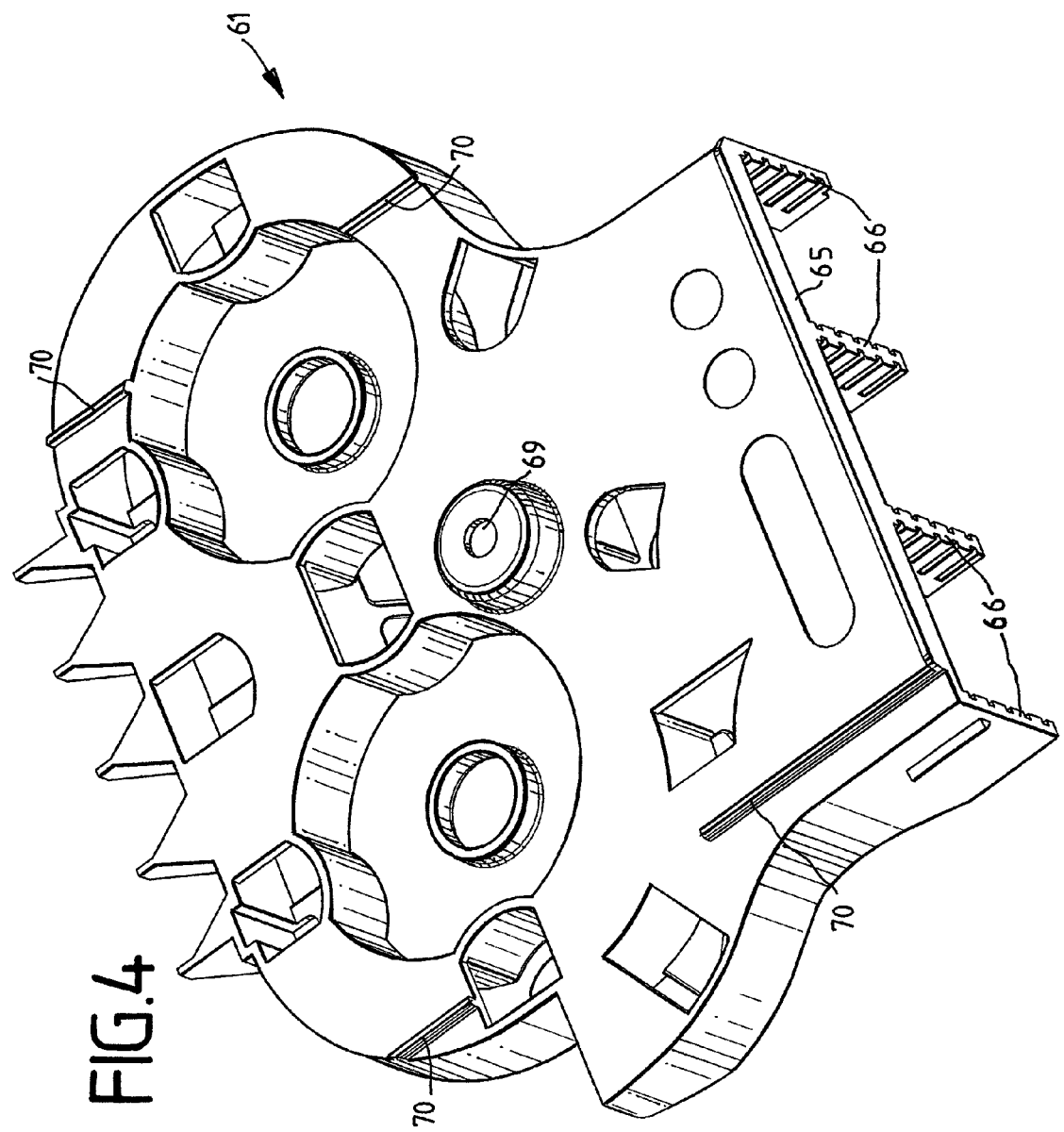

In FIG. 4, the rear of the fiber guide 61 is shown which rests against the support system 5. The fiber guide 61 has four stop edges 70 which stop against edges of the support system 5 and thus prevent the fiber guide 61 from tilting.

Figure 5:
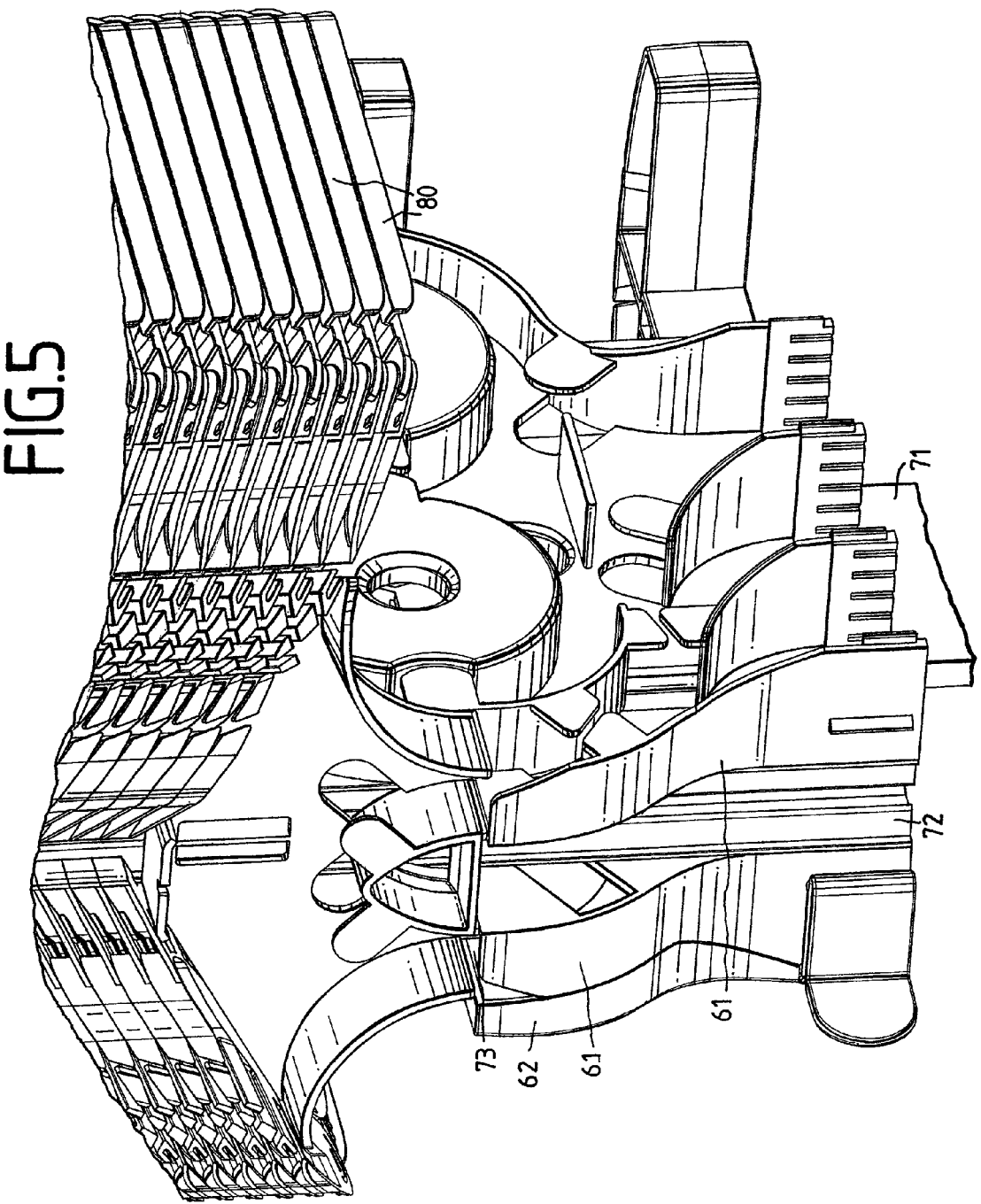

FIG. 5 shows the fiber management system 6 in a side view. At the center support 71 of the support system 5, the two fiber guides 61 for the front and rear V, R are screwed on, the stop edges 70 stopping against stop edges of two profiled supports 72 which are connected to the center support 71, the rear profiled support 72 being covered in the illustration. On the side on the top side 73 of the fiber guides 61 for the front and rear V, R, a fiber side guide 74 is arranged which allows patching of the fibers on the side from the front V to the rear R of the closure 1. The fiber side guide 74 can be a separate component or in each case connected in halves in one piece with the fiber guides 61 for the front and rear V, R.

FIG. 6 shows a top view of the closure 1 with the unit repository 7 removed. It shows covers 81 for the splice cassettes 80. The profiled supports 72 have a center plate-shaped area 82 which is adjoined by a U-shaped area 83. On the other side, an area 84 follows which is initially constructed to be V-shaped, the arms 85 then extending in parallel and having inward-pointing bends 86. The splice cassettes 80 are pushed from the top onto the profiled supports 72. The cover 81 is then pushed over the last topmost splice cassette 80 and fixed via screwable stoppers 87. Unit guides 90 are inserted into the area 84 of the left-hand profiled support. On the other profiled support 72, the fiber side guide 74 is inserted, for example.

The unit guide 90 comprises a center web 91 which subdivides an outer edging 92 into two guides 93, 94 (see FIG. 7). In this arrangement, the outer edging 92 on in each case one of the guides 93, 94 is constructed with a free cut 99 so that the parts 95, 96 of the outer edging 92 are resilient. This allows the units 22 to be introduced from the side. In the extension of the center web 91, the unit guide 90 is constructed with a trunk 97, at the end of which an arrow-shaped projection 98 is arranged. If the unit guide 90 is then inserted into the profiled support 72, the arrow-shaped projection 98 latches behind the bend 86 of the profiled support 72. The construction with two guides 93, 94 makes it possible to achieve a clearly separated division of the units 22 leading to the unit repository 7 and the units 22 leading back.

FIG. 8 shows the unit repository 7. The unit repository 7 has an essentially cylindrical shape which is closed towards the top by a removable lid 100. Out of the surface area 101, three elastic stays 102 are cut away which resiliently press against the case top 120 slipped over and thus stabilize the unit repository 7. Furthermore, the unit repository 7 has an opening 103 below which a rounding 104 is arranged.

In FIG. 9, the unit repository 7 is shown without lid 100. On the insides of the surface area 101, retainers 105 are arranged. Furthermore, a winding cylinder 106 is arranged centrally on a bottom area 107. The units 22 are conducted through the unit guides 90 to the unit repository 7 and inserted through the opening 103, wound around the winding cylinder 106 and then brought out again through the opening 103. The unit repository 7 thus allows a central, orderly deposition of spare lengths of uncut units 22 which are only looped through the closure 1.

Figure 10:
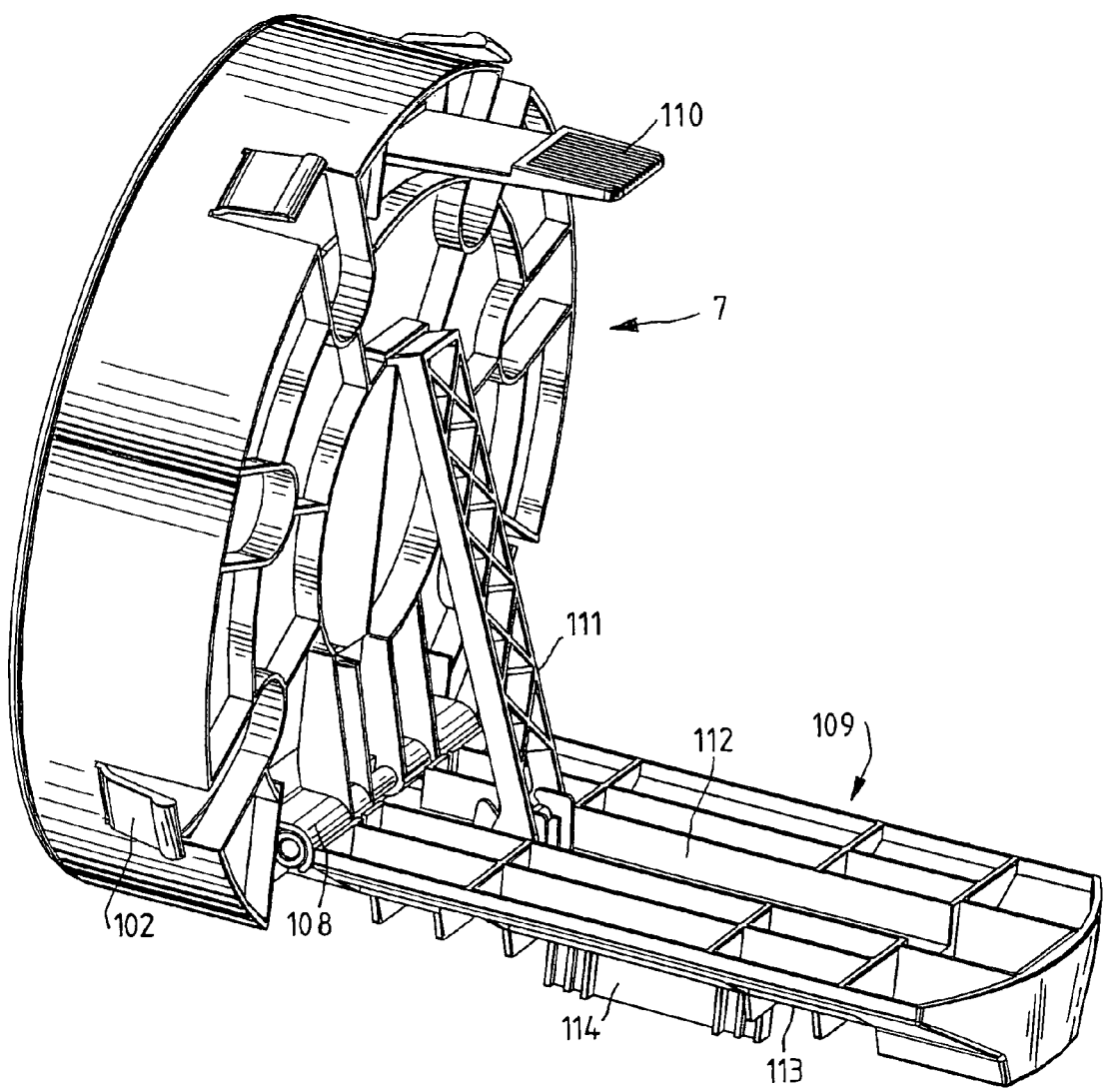

FIG. 10 shows the unit repository 7 in an opened state. For this purpose, the unit repository 7 can be swiveled by approximately 90° with respect to a lower part 109 via a swivel bearing 108. The lower part 109 is latched and/or screwed to the support system 5. On the under side, the unit repository is constructed with a latching hook 110 which latches to the lower part 109 in the base position (see FIG. 1). In the open position, the unit repository 7 is held by a support strut 111, which is latched in, and supported against the lower part 109. In the base position, the support strut 111 plunges into a receptacle 112. Using a plug-in rail 114 arranged on an underside 113 of the lower part 109, the lower part 109 can then be plugged with the unit repository 7 onto the top side of the support system 5, the plug-in rail 114 latching in between the two U-shaped areas 83 of the profiled supports 72.

FIG. 11 shows a side view of a case top 120 which is supported on the closure 1 from the top and is connected to the case bottom 3.

Figure 12:
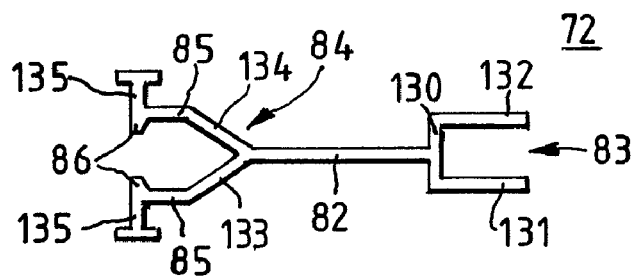
Figure 13:
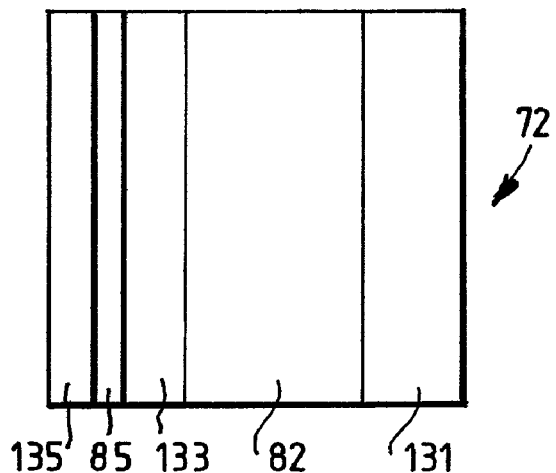
Figure 14:
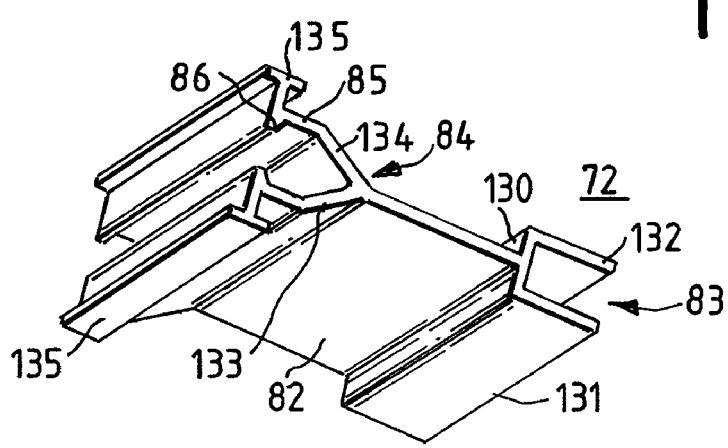

FIGS. 12 to 14 show the profiled support 72 in a top view, side view and a perspective. As described for FIG. 6, the profiled support 72 has a plate-shaped area 82 which is adjoined on one side by the U-shaped area 83 and on the other side by the V-shaped area 84. The U-shaped area 83 comprises a base 130 and two arms 131, 132, the arms 131, 132 being perpendicular to the base 130 which, in turn, is perpendicular to the plate-shaped area 82. The arms 131, 132 therefore extend in parallel with the plate-shaped area 82. The V-shaped area 84 also has two arms 133, 134 which initially run apart and which are then adjoined by the parallel arms 85 which are then also parallel to the plate-shaped area 82. From these arms 85, the inward-pointing bends 86 then extend which then form a latching lock. Pointing outwards, T-shaped fixing means 135 in each case project from the arms 85, over which, for example, the splice cassettes 80 are pushed.

Figure 15:
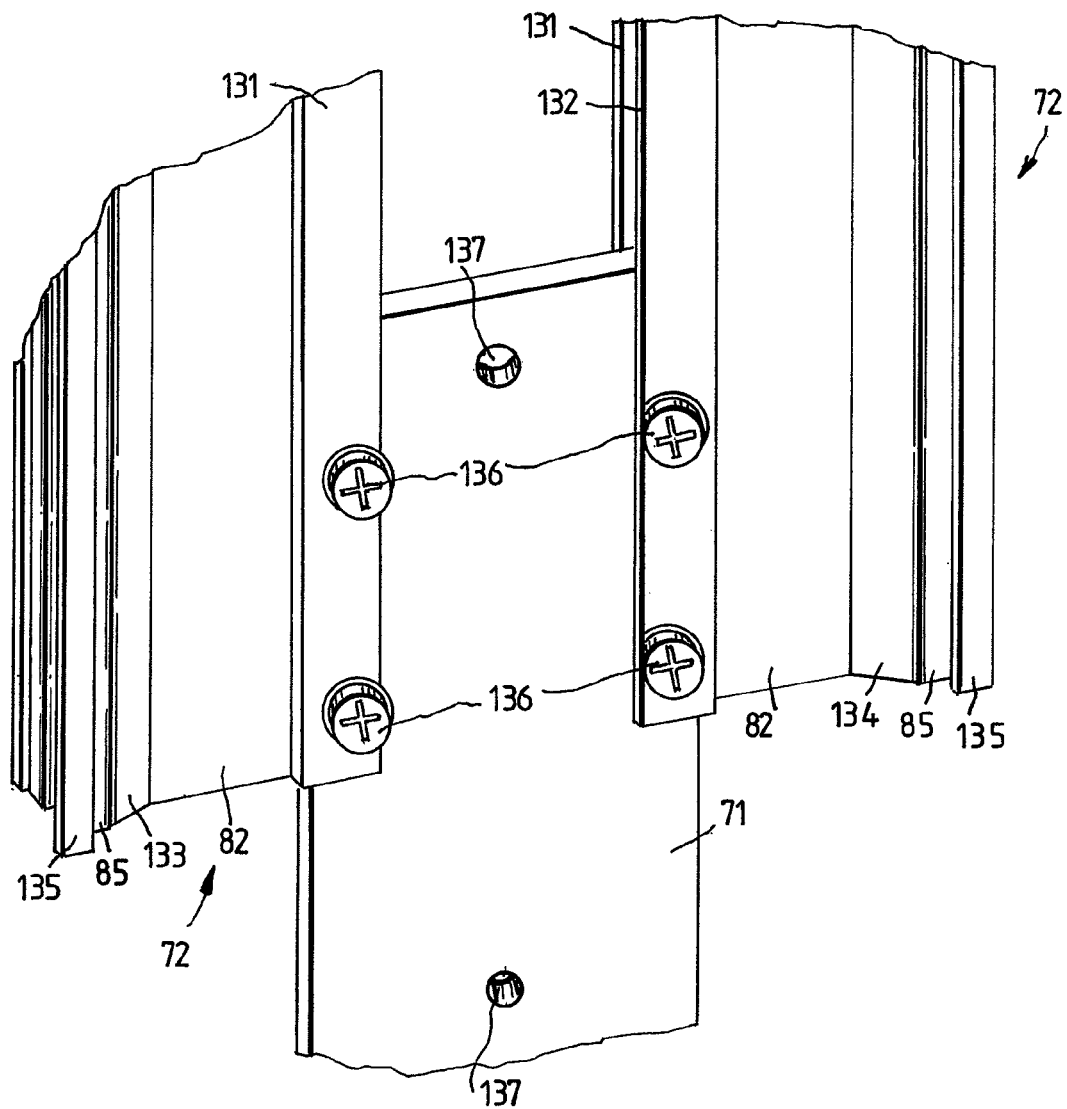

FIG. 15 shows the connection of the two supports 72 to the center support 71. In this arrangement, the center support 71 is screwed to the arms 131, 132 of the U-shaped areas 83 by means of screws 136. The two profiled supports 72 are of completely identical construction but rotated with respect to one another by 180° so that the arm 131 is at the front in the case of the left-hand profiled support 72 and the arm 132 is at the front in the case of the right-hand profiled support 72. Furthermore, the center support 71 has holes 137 by means of which a fiber management system 6 can be attached to the center support 71 or, respectively, the center support 71 can be joined to the bracket 4.

LIST OF REFERENCE DESIGNATIONS

1 Closure
2 Optical fiber cable
3 Case bottom
4 Bracket
5 Support system
6 Fiber management system
7 Unit repository
21 Central element
22 Unit
30 Opening
31 Baseplate
32 Circumferential part
33 Screw
34 Thread
35 Sealing element
41 Underside
42 Base feet
43 Holes
44 Top side
45 Seats
46 Ground plate
47 Holes
48 Metal angle
49 Designed bending point
50 Fixing element
51 Cheek
52 Plate
53 Ground strap
54 Scroll spring
55 Clamp
56 Mounting arm
61 Fiber guide front/rear
62 Cover
63 Coil former
64 Retainer
65 Underside
66 Guide webs
67, 68 Guides
69 Opening
70 Stop edges
71 Center support
72 Profiled support
73 Top side
74 Fiber side guide
80 Splice cassette
81 Covers
82 Plate-shaped area
83 U-shaped area
84 V-shaped area
85 Arm
86 Bends
87 Stopper
90 Unit guides
91 Center web
92 Edging
93, 94 Guides
95, 96 Parts
97 Trunk
98 Arrow-shaped projection
99 Free cut
100 Lid 101 Surface area
102 Stays
103 Opening
104 Rounding
105 Retainer
106 Winding cylinder
107 Bottom area
108 Swivel bearing
109 Lower part
110 Latching hook
111 Support strut
112 Receptacle
113 Underside
114 Plug-in rail
120 Case top
130 Base
131 Arm
132 Arm
133 Arm
134 Arm
135 T-shaped fixing means
136 Screw
137 Hole
V Front
R Rear

The invention claimed is:

1. A support system for fixing telecommunication and data systems technology resources, comprising:
at least one profiled support, each profiled support having a center plate-shaped area which is adjoined on a first side by a U-shaped area and on a second side by a V-shaped area, each profiled support also including first arms extending outwardly from the V-shaped area in parallel, the first arms having inward-pointing bends, wherein each profiled support also includes fixing members extending outwardly from the first arms.

2. The support system as claimed in claim 1, further comprising a second profiled support, wherein the two profiled supports are aligned in such a manner that the U-shaped areas are disposed opposite one another and such that opposing arms of the U-shaped areas are disposed planar with each other.

3. The support system as claimed in claim 1, wherein the fixing members are constructed to be T-shaped.

4. The support system as claimed in claim 1, wherein a center support is arranged on the underside of an support system.

5. The support system as claimed in claim 4, wherein the center support is arranged between the U-shaped areas.

6. The support system as claimed in claim 4, wherein the center support is constructed with holes.

7. The support system as claimed in claim 5, wherein stiffening plates are arranged between the profiled supports.

8. A support system for fixing telecommunication and data systems technology resources, comprising:
a support member having a top, a bottom, a first side, and a second side, the first side of the support member defining a first outward-facing channel that extends between the top and the bottom of the support member, the second side of the support member defining a second outward-facing channel that extends between the top and the bottom of the support member, the first outward-facing channel being spaced from the second outward-facing channel along an intermediate flange;
wherein the first outward-facing channel of the support member has a U-shaped lateral cross-sectional profile and a first portion of the second outward-facing channel of the support member has a V-shaped lateral cross-sectional profile, and wherein an open side of the second outward-facing channel is pinched by inward projections.

9. The support system as claimed in claim 8, wherein a second portion of the second outward-facing channel of the support member is defined by parallel arms that extend between the first portion of the second outward-facing channel and the inward projections.

10. The support system as claimed in claim 9, wherein fixing flanges extend outwardly from the arms opposite the inward projections.

11. The support system as claimed in claim 10, wherein the fixing flanges are T-shaped.

12. The support system as claimed in claim 8, further comprising:
a second support member having a top, a bottom, a first side, and a second side, the first side of the second support member defining a first outward-facing channel that extends between the top and the bottom of the second support member, the second side of the second support member defining a second outward-facing channel that extends between the top and the bottom of the second support member, the first outward-facing channel being spaced from the second outward-facing channel along an intermediate flange;
wherein the first outward-facing channel of the second support member has a U-shaped lateral cross-sectional profile and a first portion of the second outward-facing channel of the second support member has a V-shaped lateral cross-sectional profile, and wherein an open side of the second outward-facing channel is pinched by inward projections.

13. The support system as claimed in claim 12, further comprising:
a support beam having opposite major surfaces extending between opposite minor surfaces; wherein the support member is coupled to the support beam so that one of the minor surfaces of the support beam is disposed in the first outward-facing channel of the support member; and wherein the second support member is coupled to the support beam so that the other of the minor surfaces of the support beam is disposed in the first outward-facing channel of the second support member.

* * * * *